(12) United States Patent
Wilson

(10) Patent No.: US 9,062,810 B2
(45) Date of Patent: Jun. 23, 2015

(54) OIL DEFLECTION APPARATUS

(71) Applicant: Stanley Wilson, Baker, MT (US)

(72) Inventor: Stanley Wilson, Baker, MT (US)

(73) Assignee: Montana Oil Field Designs, LLC, Baker, MT (US)

(*) Notice: Subject to any disclaimer, the term of this patent is extended or adjusted under 35 U.S.C. 154(b) by 267 days.

(21) Appl. No.: 13/913,646

(22) Filed: Jun. 10, 2013

(65) Prior Publication Data

US 2014/0360592 A1    Dec. 11, 2014

(51) Int. Cl.
| | | |
|---|---|---|
| *D06F 39/08* | (2006.01) |
| *F16K 23/00* | (2006.01) |
| *F16L 55/168* | (2006.01) |
| *F16L 23/16* | (2006.01) |
| *E03B 1/00* | (2006.01) |
| *E03B 3/00* | (2006.01) |
| *F16K 27/08* | (2006.01) |
| *F16L 35/00* | (2006.01) |
| *F16P 1/00* | (2006.01) |
| *F17D 1/00* | (2006.01) |
| *E21B 19/00* | (2006.01) |
| *F16L 55/00* | (2006.01) |
| *F16L 11/12* | (2006.01) |
| *E21B 21/01* | (2006.01) |

(52) U.S. Cl.
CPC .......... *F16L 55/168* (2013.01); *Y10T 137/5762* (2015.04); *F16L 23/167* (2013.01); *F16L 35/00* (2013.01); *E21B 21/01* (2013.01)

(58) Field of Classification Search
CPC ......... F16L 23/00; F16L 23/16; F16L 23/167; F16L 55/168; F16L 35/00; E21B 21/01
USPC ........... 137/312, 313, 314, 377, 381; 285/13, 285/45, 148.6; 166/81.1
See application file for complete search history.

(56) References Cited

U.S. PATENT DOCUMENTS

| | | | | |
|---|---|---|---|---|
| 1,255,023 | A | * | 1/1918 | Lang .............................. 285/45 |
| 1,510,483 | A | * | 10/1924 | Lang .............................. 285/45 |
| 1,629,431 | A | * | 5/1927 | Bennett ............................ 285/8 |
| 1,910,045 | A | | 5/1931 | Paryzek |
| 2,520,820 | A | * | 8/1950 | Williams ...................... 122/504 |
| 2,634,812 | A | | 4/1953 | Allemang |
| 2,921,774 | A | * | 1/1960 | Glasgow et al. ................ 165/84 |
| 3,902,555 | A | | 9/1975 | Edge et al. |
| 3,945,213 | A | | 3/1976 | Forbes et al. |
| 5,470,110 | A | * | 11/1995 | Hupe ............................. 285/13 |
| 5,678,864 | A | | 10/1997 | Brown |
| 7,458,618 | B2 | | 12/2008 | Mahnken et al. |
| 8,439,060 | B1 | * | 5/2013 | Jackson .......................... 137/1 |

* cited by examiner

*Primary Examiner* — Kevin Murphy
*Assistant Examiner* — Josephine Trinidad-Borges
(74) *Attorney, Agent, or Firm* — Antoinette M. Tease

(57) ABSTRACT

An apparatus for deflecting leaking oil comprising a first L-shaped member comprising a pivot arm and a latch mechanism and a second L-shaped member that is slidably coupled to the first L-shaped member. The pivot arm on the first L-shaped member is configured to pivot on the first L-shaped member and to engage with a plurality of recesses on the second L-shaped member. The latch mechanism is configured to lock and unlock the pivot arm. The first and second L-shaped members each comprises a flat center surface and two flat side surfaces that form a channel on an underside of the L-shaped members. The channels are configured to fit around at least one flange on a heater treater.

4 Claims, 17 Drawing Sheets

OIL DEFLECTION APPARATUS

BACKGROUND OF THE INVENTION

1. Field of the Invention

The present invention relates generally to the field of oil and gas equipment and, more specifically, to an oil deflection shield for deflecting leaking oil into a containment ditch.

2. Description of the Related Art

A heater treater is a critical piece of equipment used in the oil and gas production process. Heater treaters break wellstream emulsions by separating crude oil from water and other foreign materials. Heater treaters come in two versions—a horizontal unit and a vertical unit. Both types of heater treaters utilize a U-shaped fire tube that is situated inside of the heater treater to heat the incoming oil-water emulsion. The increased temperature reduces the molecular attraction between the oil and water molecules and allows the water droplets to settle out more rapidly. The vertical units typically treat single wells only, whereas the horizontal units typically treat multiple wells. FIGS. 16 and 17 illustrate the orientation of the fire tube within the vertical and horizontal heater treaters, respectively.

Both horizontal and vertical heater treaters operate under pressure in order to boost the oil out of the treater and into a storage tank. The horizontal units can handle larger amounts of emulsion than the vertical units because the relatively long, U-shaped fire tube provides greater heating capacity, which leads to a higher treating rate. On both types of heater treaters, the fire tube connects to the treater via a flange on the fire tube and a flange on the treater; these two flanges are bolted together, and a rubber gasket is situated between them (see FIGS. 16 and 17). This rubber gasket frequently fails, which can lead to catastrophic oil leaks. These oil leaks cause damage to the environment, including surrounding water supplies, vegetation, and domestic and wild animals. Remediation costs can be significant in these situations.

Most heater treaters are situated above EPA-required containment dikes. The purpose of these containment dikes is to contain any oil that may leak from any of the flanges on the treater. If the leak is directly underneath the flange, then the oil will spill into the containment dike. If the leak is out of the top or sides of the flange, however, then the oil will overshoot the containment dike. The present invention is designed to deflect oil that leaks from the top or sides of a flange on a heater treater (horizontal or vertical unit) down and into the containment dike.

Although the above description of the problem refers to leaking oil, it should be understood that the leaking fluid usually contains both oil and hot water. The present invention may be used at any flange connection point (i.e., any place where two flanges are bolted together) on the heater treater to deflect leaking fluid into the containment ditch directly underneath the heater treater. For example, in addition to being used to contain leaks emanating from the flange that connects the fire tube to the heater treater, as is described more fully below, the present invention may also be used to contain leaks from manway covers 25 (see FIG. 15).

BRIEF SUMMARY OF THE INVENTION

The present invention is an apparatus for deflecting leaking oil comprising: a first L-shaped member comprising a pivot arm and a latch mechanism; and a second L-shaped member that is slidably coupled to the first L-shaped member; wherein the pivot arm on the first L-shaped member is configured to pivot on the first L-shaped member and to engage with a plurality of recesses on the second L-shaped member; wherein the latch mechanism is configured to lock and unlock the pivot arm; wherein each of the first and second L-shaped members comprises a flat center surface and two flat side surfaces that form a channel on an underside of each of the first and second L-shaped members; and wherein the channels of the first and second L-shaped members are configured to fit around at least one flange on a heater treater.

In a preferred embodiment, the first L-shaped member comprises a plurality of apertures at a bottom end of the first L-shaped member; the second L-shaped member comprises a plurality of apertures at a bottom end of the second L-shaped member; and the apertures on the bottom end of the first L-shaped member and the apertures on the bottom end of the second L-shaped member are configured for attachment of a chain.

In a preferred embodiment, the channel of the first L-shaped member comprises a top section and a side section, and the top section is longer than the side section; and the channel of the second L-shaped member comprises a top section and a side section, and the top section is longer than the side section. In another preferred embodiment, the channel of the first L-shaped member comprises a top section and a side section, and the side section is longer than the top section; and the channel of the second L-shaped member comprises a top section and a side section, and the side section is longer than the top section.

REFERENCE NUMBERS

Figure 1:
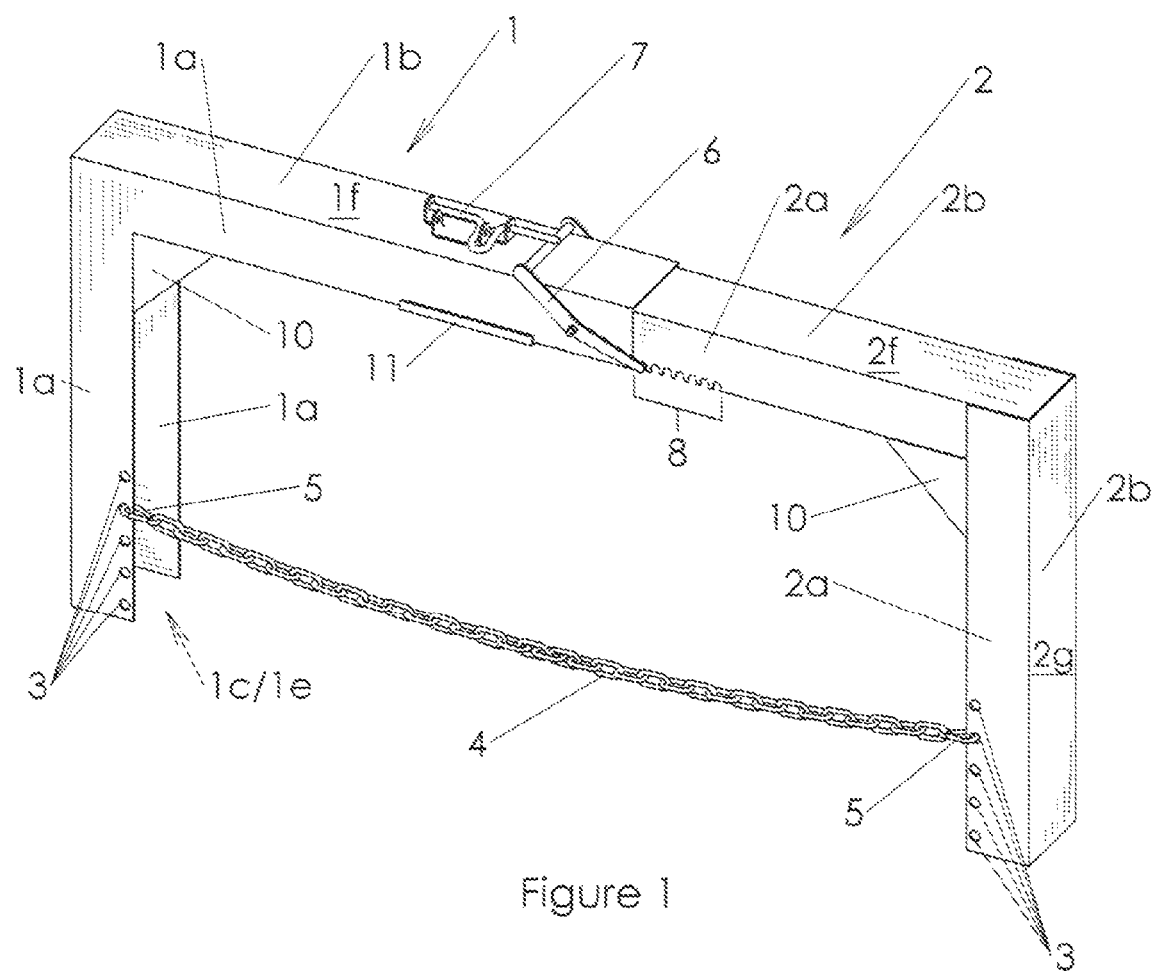
FIG. 1 is a top perspective view of a first embodiment of the present invention.

1 First L-shaped member
1a Flat side surface
1b Flat center surface
1c Channel
1d Top section (of channel)
1e Side section (of channel)
1f Top portion (of flat center surface)
1g Bottom portion (of flat center surface)
2 Second L-shaped member
2a Flat side surface
2b Flat center surface
2c Channel
2d Top section (of channel)
2e Side section (of channel)
2f Top portion (of flat center surface)
2g Bottom portion (of flat center surface)
3 Aperture
4 Chain
5 Clip
6 Pivot arm
7 hatch mechanism
8 Recess
9 Inward protrusion
10 Diagonal brace
11 Stabilization bracket
12 Flange
13 Fire tube
14 Heater treater
15 Fire stack
16 Dry gas line
17 Rubber gasket
18 Pivoting bracket
19 Pivot post
20 Rod
21 Slide bar
22 First stop
23 Second stop
24 Pin
25 Manway

DETAILED DESCRIPTION OF INVENTION

Figure 2:
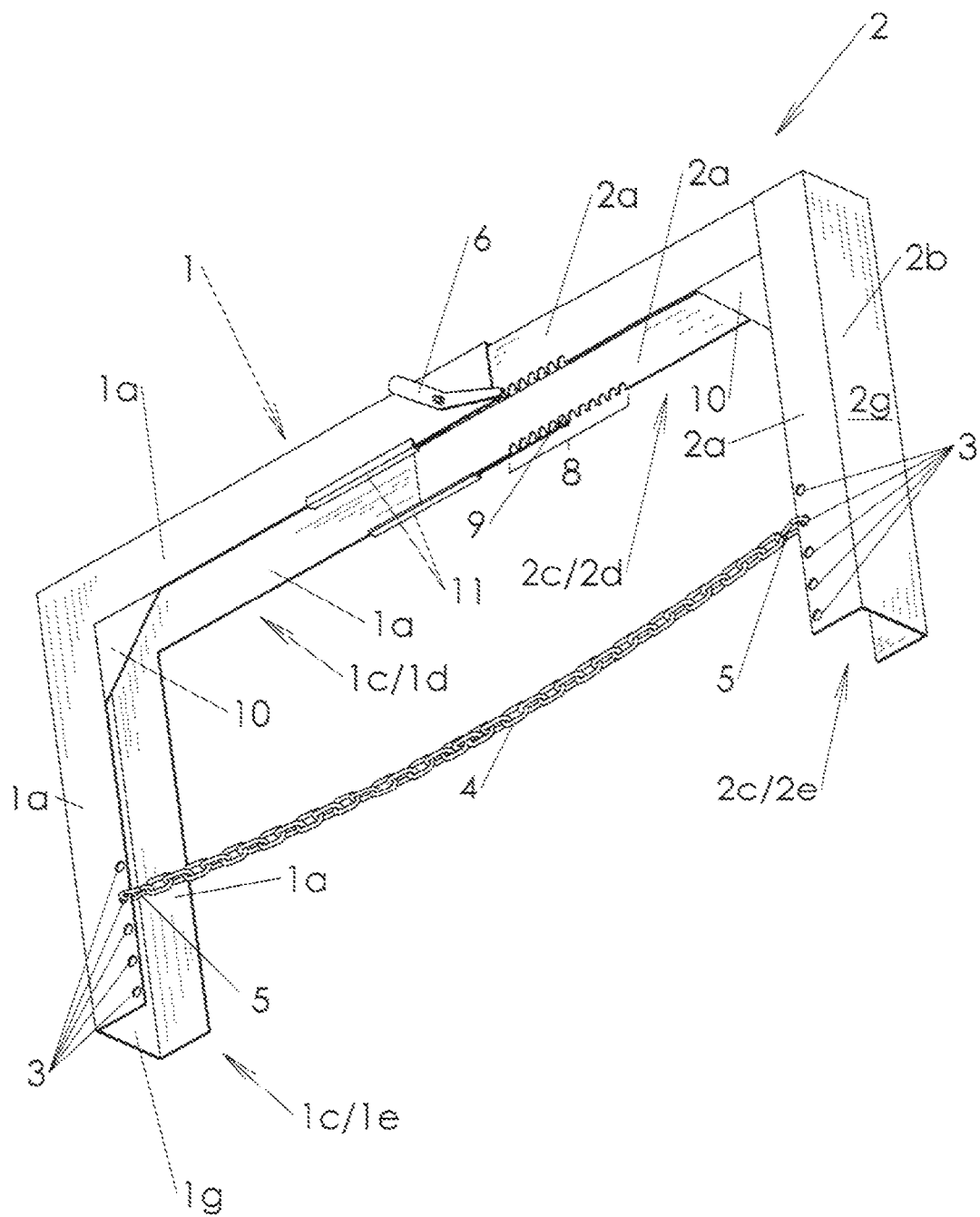
FIG. 2 is a bottom perspective view of a first embodiment of the present invention.

FIG. 1 is a top perspective view and FIG. 2 is a bottom perspective view of a first embodiment of the present invention. As shown in these figures, the present invention comprises a first L-shaped member 1 and a second L-shaped member 2. Both L-shaped members are comprised of two flat side surfaces 1a, 2a and a flat center surface 1b, 2b, with the center surface being positioned between the two side surfaces and each of the side surfaces being perpendicular to the center surface. Thus, a channel 1e, 2e is formed on the underside of each of the L-shaped members. Each channel 1c, 2c comprises a top section 1d, 2d and a side section 1e, 2e, with the top section of the channel being perpendicular to the side section of the channel (just as the top portion 1f, 2f of each flat center surface is perpendicular to the bottom portion 1g, 2g of each flat center surface).

The width of the top portion 2f of the center surface 2b of the second L-shaped member 2 is preferably slightly less than the width of the top portion 1f of the flat center surface 1b of the first L-shaped member 1 so that the top portion 2f of the flat center surface 2b and the two flat side surfaces 2a that are adjacent (perpendicular) to the top portion 2f of the flat center surface 2b fit slidably into the channel 1d formed by the top portion 1f of the flat center surface 1b of the first L-shaped member 1 and the two flat side surfaces 1a that are adjacent (perpendicular) to the top portion 1f of the flat center surface 1b.

Each of the first and second L-shaped members 1, 2 comprises a proximal end and a distal end. The proximal ends of each of the first and second L-shaped members are slidably engaged with one another, as described in the previous paragraph. The distal (or bottom) ends of each of the L-shaped member preferably comprise a plurality of apertures (holes) 3 on the outer of the two flat side surfaces 1a, 2a. These apertures allow a chain 4 to be fastened between the two L-shaped members (see also FIGS. 5 and 13). As shown in subsequent figures, the chain 4 prevents the apparatus from moving upward or outward once it has been installed on a heater treater. The chain 4 preferably comprises a clip 5 on either end of the chain.

Figure 7:
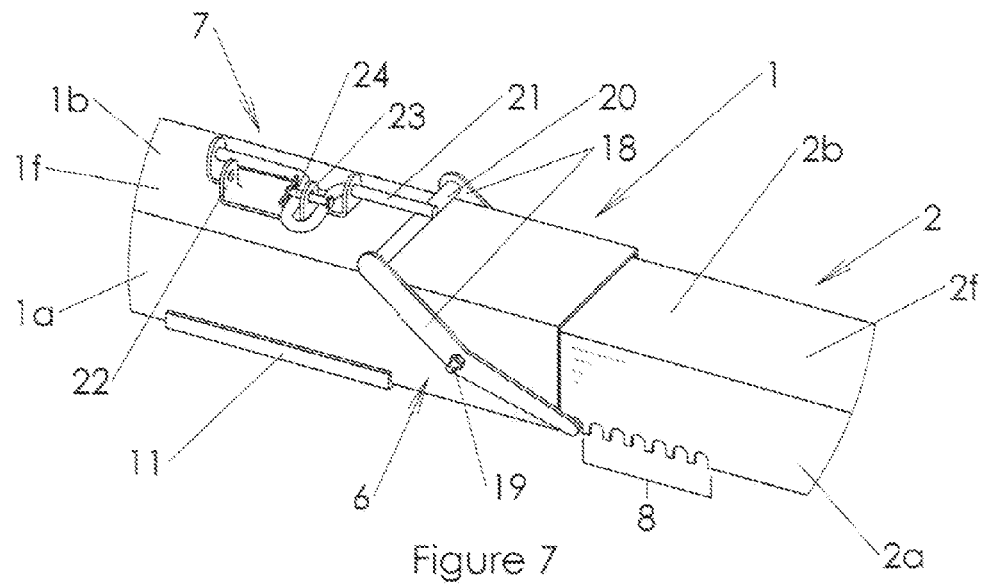
FIG. 7 is a detail perspective view of the latch mechanism of the present invention shown in a closed and locked position.
Figure 8:
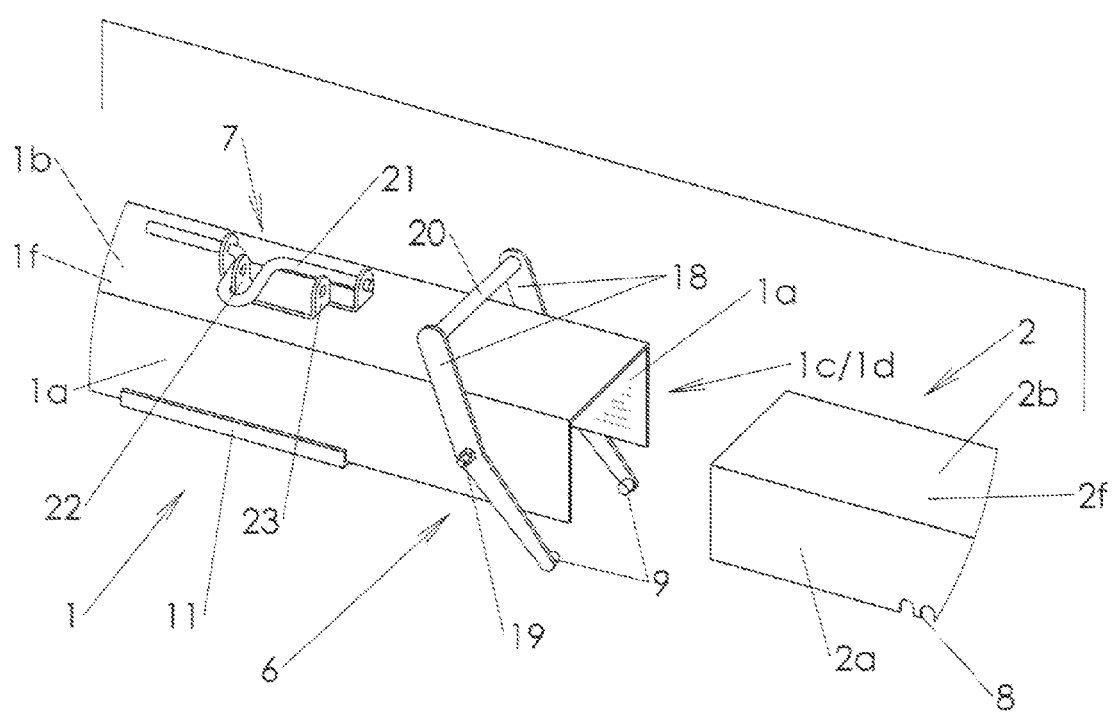
FIG. 8 is a detail perspective view of the latch mechanism of the present invention shown in an open position.

The proximal end of the first L-shaped member 1 comprises a pivot arm 6 and a latch mechanism 7, both of which are shown in greater detail in FIGS. 7 and 8. The proximal end of the second L-shaped member 2 comprises a plurality of recesses 8 on the bottom edges of the flat side surfaces 2a. These recesses 8 engage with inward protrusions 9 on the pivot arm 6 to allow the width of the apparatus to be adjusted, as explained more fully below.

In a preferred embodiment, the invention comprises a diagonal brace 10 at the perpendicular joint of the flat side surfaces 1a, 2a on the first and second L-shaped members. (Each L-shaped member comprises two flat side surfaces—an outer flat side surface and an inner flat side surface—with each flat side surface comprising a perpendicular joint.) The diagonal braces 10 may be used in connection with only the outer of the two flat side surfaces 1a, 2a (i.e., the same two flat side surfaces on whose distal ends are located the apertures 3 for attachment of the chain 4), only the inner of the two flat side surfaces 1a, 2a or both.

In a preferred embodiment, the invention comprises two stabilization brackets 11 that are welded onto the proximal end of the first L-shaped member. More specifically, the stabilization brackets are welded onto the bottom edge of each of the two flat side surfaces 1a (outer and inner) that are adjacent (perpendicular) to the top portion 1f of the flat center surface 1b of the first L-shaped member. These stabilization brackets 11 provide added support where the second L-shaped member slides into the first L-shaped member (this is best shown in FIG. 2).

Figure 3:
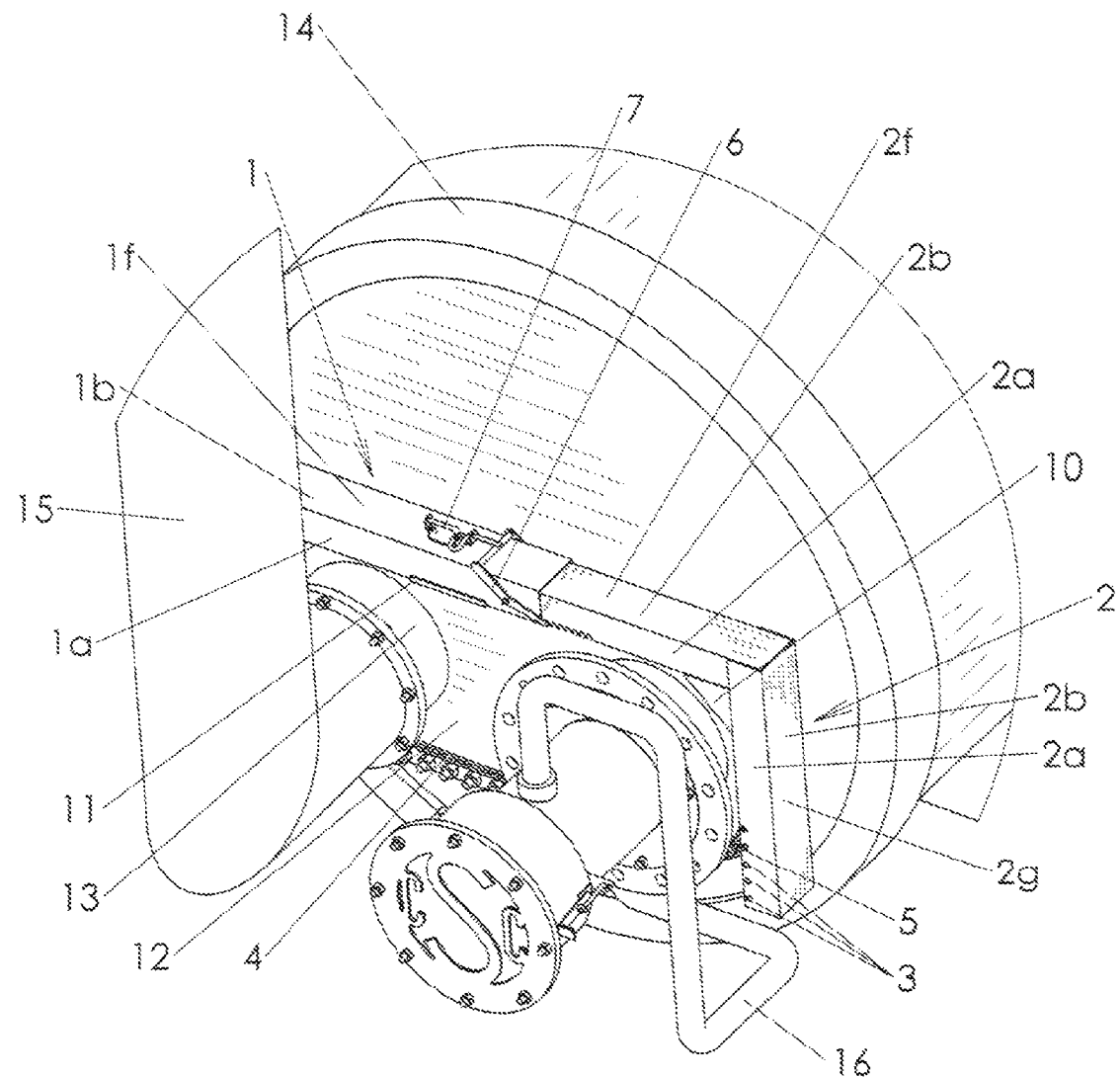
FIG. 3 is first perspective view of a first embodiment of the present invention installed on a horizontal heater treater.
Figure 4:
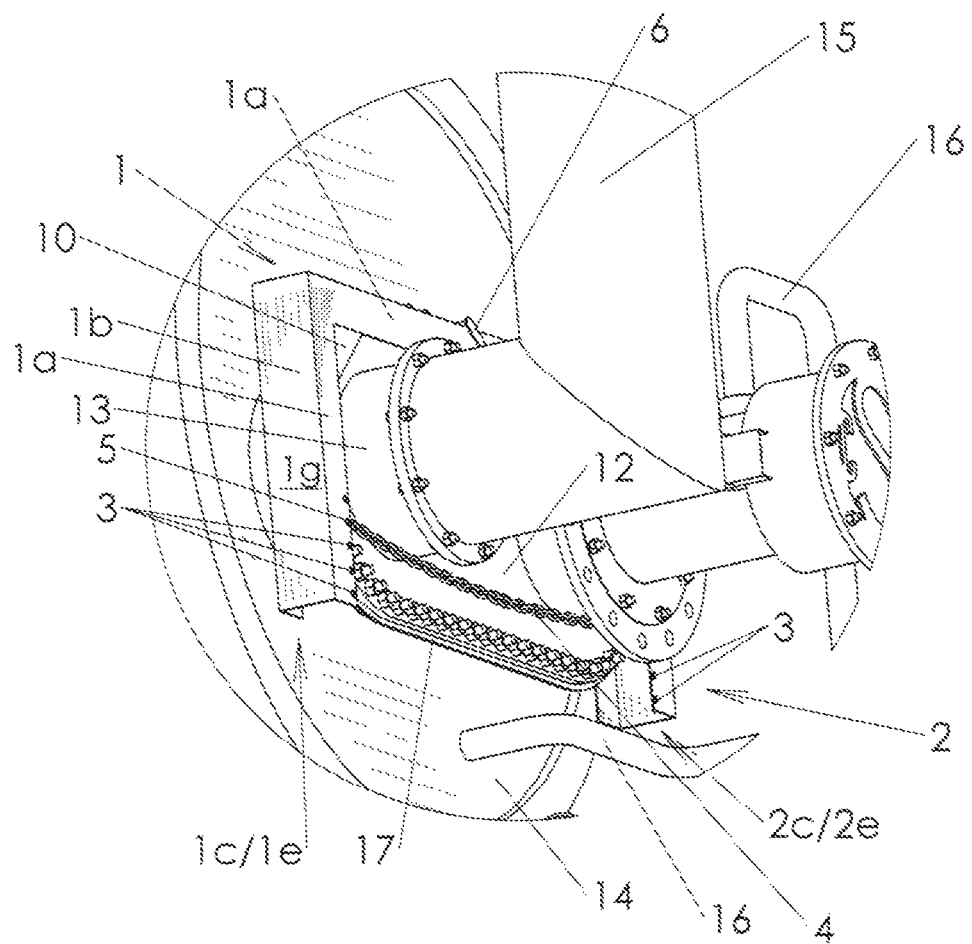
FIG. 4 is a second perspective view of a first embodiment of the present invention installed on a horizontal heater treater.

FIG. 3 is first and FIG. 4 is a second perspective view of a first embodiment of the present invention installed on a horizontal heater treater. As shown in these figures, the top and side channels 1d, 1e, 2d, 2e formed by the first and second L-shaped members 1, 2 are situated around the top and sides of the flange 12 that connects the fire tube 13 to the heater treater 14. The fire stack 15 and dry gas line 16 to the burner (not shown) are also labeled. On the horizontal heater treater, the fire stack 15 and dry gas line 16 are situated next to each other (left to right), whereas on the vertical heater treater, the fire stack 15 and dry gas line 16 are situated one on top of the other (see FIG. 11).

Figure 5:
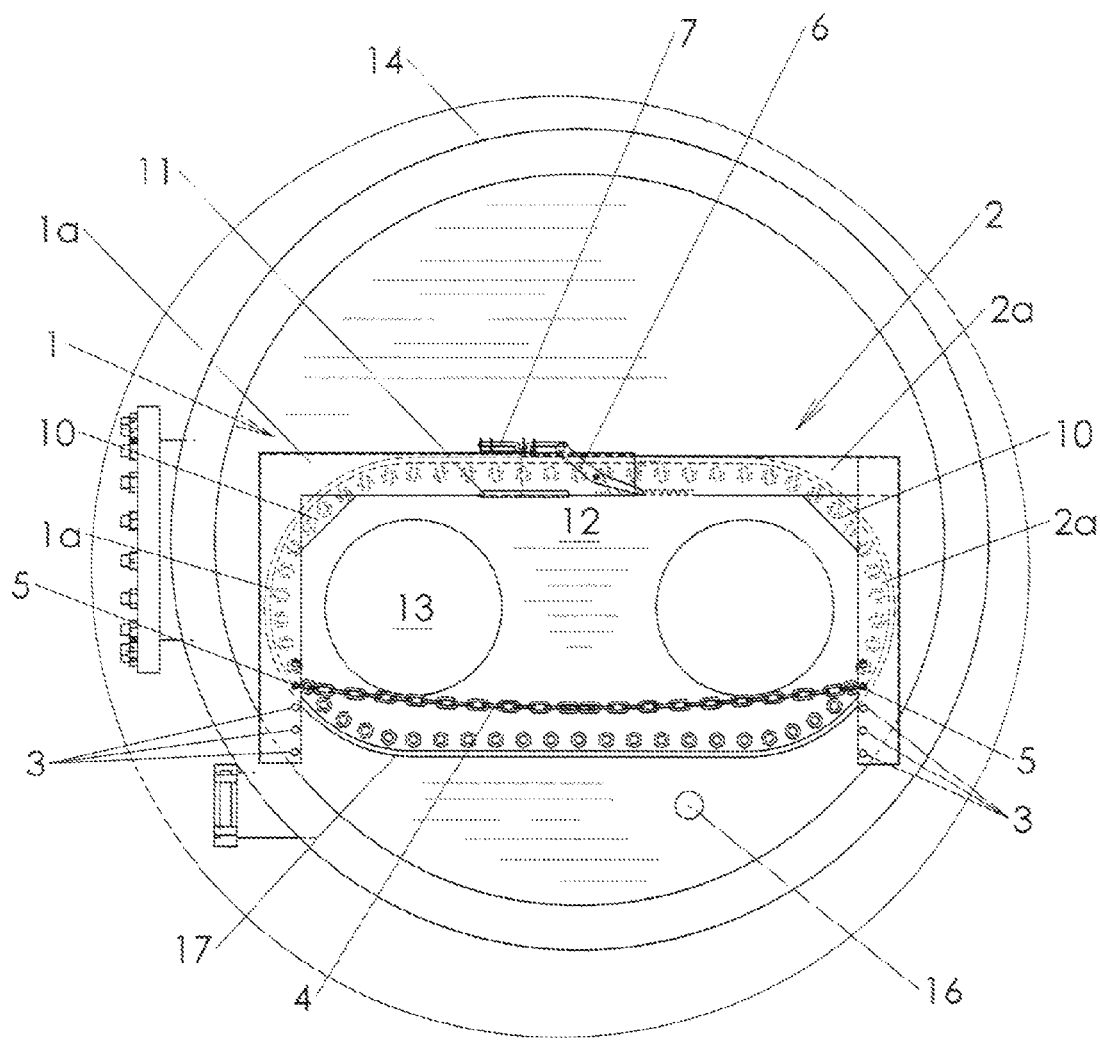
FIG. 5 is a front view of a first embodiment of the present invention installed on a horizontal heater treater.

FIG. 5 is a front view of a first embodiment of the present invention installed on a horizontal heater treater. This figure clearly shows the rubber gasket 17 between the flanges on the fire tube 13 and the heater treater 14. The top and side channels 1d, 1e, 2d, 2e formed by the first and second L-shaped members 1, 2 are situated around this rubber gasket 18 so that if it fails, oil and/or hot water will hit the inside of the channels and be deflected downward into the containment dike (not shown).

Figure 6:
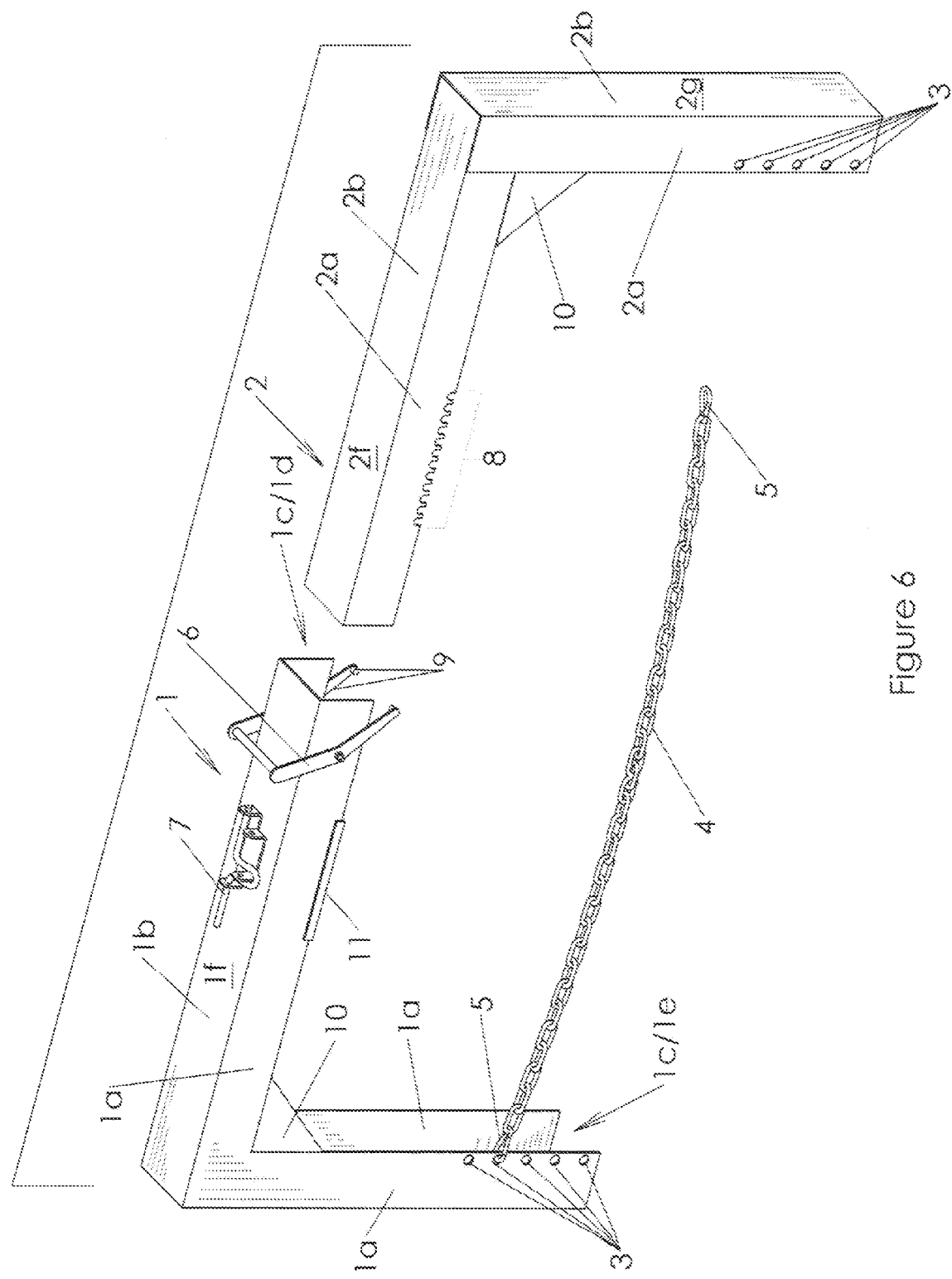
FIG. 6 is an exploded view of a first embodiment of the present invention.

FIG. 6 is an exploded view of a first embodiment of the present invention. This figure shows the apparatus when the first L-shaped member 1 has been decoupled from the second L-shaped member 2. In order for this to happen, the latch mechanism 7 must be unlocked so that the inward protrusions 9 on the pivot arm 6 can disengage from the recesses 8 on the bottom edges of the flat side surfaces 2a on the proximal end of the second L-shaped member 2, thereby allowing the proximal end of the second L-shaped member 2 to be slid out of the top section 1d of the channel 1c on the first L-shaped member 1.

Figure 18:
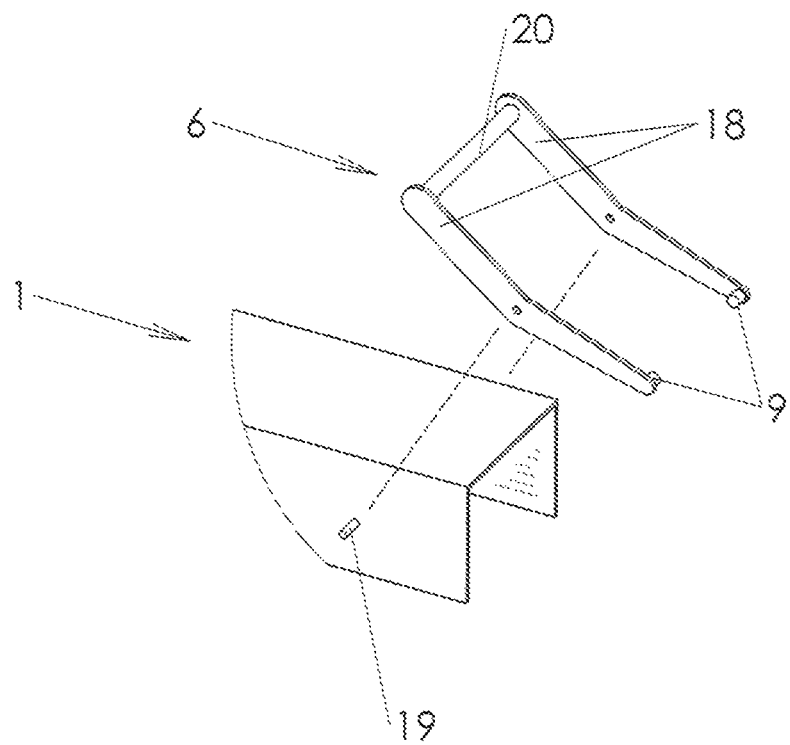
FIG. 18 is a detail view of the pivot arm.

FIG. 7 is a detail perspective view of the latch mechanism of the present invention shown in a closed and locked position, and FIG. 8 is a detail perspective view of the latch mechanism of the present invention shown in an open position. As shown in these figures, the pivot arm 6 comprises two pivoting brackets 18 situated on either side of the proximal end of the first L-shaped member 1. A pivot post 19 extends outward from each side of the proximal end of the L-shaped member (see FIG. 18), and the pivot arm 6 pivots on these pivot posts 19. Each pivoting bracket has a first end and a second end, and a rod 20 extends between the first end of each of the two pivoting brackets 18. An inward protrusion 9 extends inward from the second end of each of the two pivoting brackets 18 and is configured to engage with the recesses 8 on the underside of the proximal end of the second L-shaped member 2. Note that the inward protrusion 9 may be in the form of a bar, a knob, or even a rod that connects the two second ends of the pivoting brackets 18. The present invention is not limited to any particular form of the inward protrusion 9 as long as it is configured to engage with the recesses 8 when the second ends of the pivoting brackets 18 pivot upward.

Note that when the second ends of the pivoting brackets 18 pivot upward, the rod 20 pivots downward into the position shown in FIG. 7. The latch mechanism is situated on top of the proximal end of the flat center surface 1b of the first L-shaped member 1 and preferably comprises a slide bar 21 and first and second stops 22, 23. The slide bar 21 comprises a loop portion that extends around the first or second stop, depending upon whether the latch mechanism is open or closed, respectively. The proximal end of the slide bar 21 extends over the rod 20 on the pivot arm 6 when the latch mechanism is in a closed position, as shown in FIG. 7. A pin 24 holds the slide bar in this position. Note that a padlock may be used in lieu of the pin 24.

To remove the apparatus from the heater treater, the chain 4 is unfastened, the pin 24 is removed, the slide bar 21 is slid into an open position with the loop portion of the slide bar 21 positioned over the first stop 22, and the rod 20 is rotated upward, thereby disengaging the inward protrusions 9 from the recesses 8 and allowing the second L-shaped member 2 to be slid out from the first L-shaped member 1. This is shown in FIG. 8. Thus, the entire apparatus may be installed or uninstalled in a matter of seconds. In addition, the width of the apparatus may be adjusted by moving the inward protrusions 9 from one corresponding pair of recesses 8 (a corresponding pair of recesses being those that are located directly across from one another on the bottom edges of the flat side surfaces 2a of the proximal end of the second L-shaped member 2) to another and then locking the latch mechanism in the manner described above.

Figure 9:
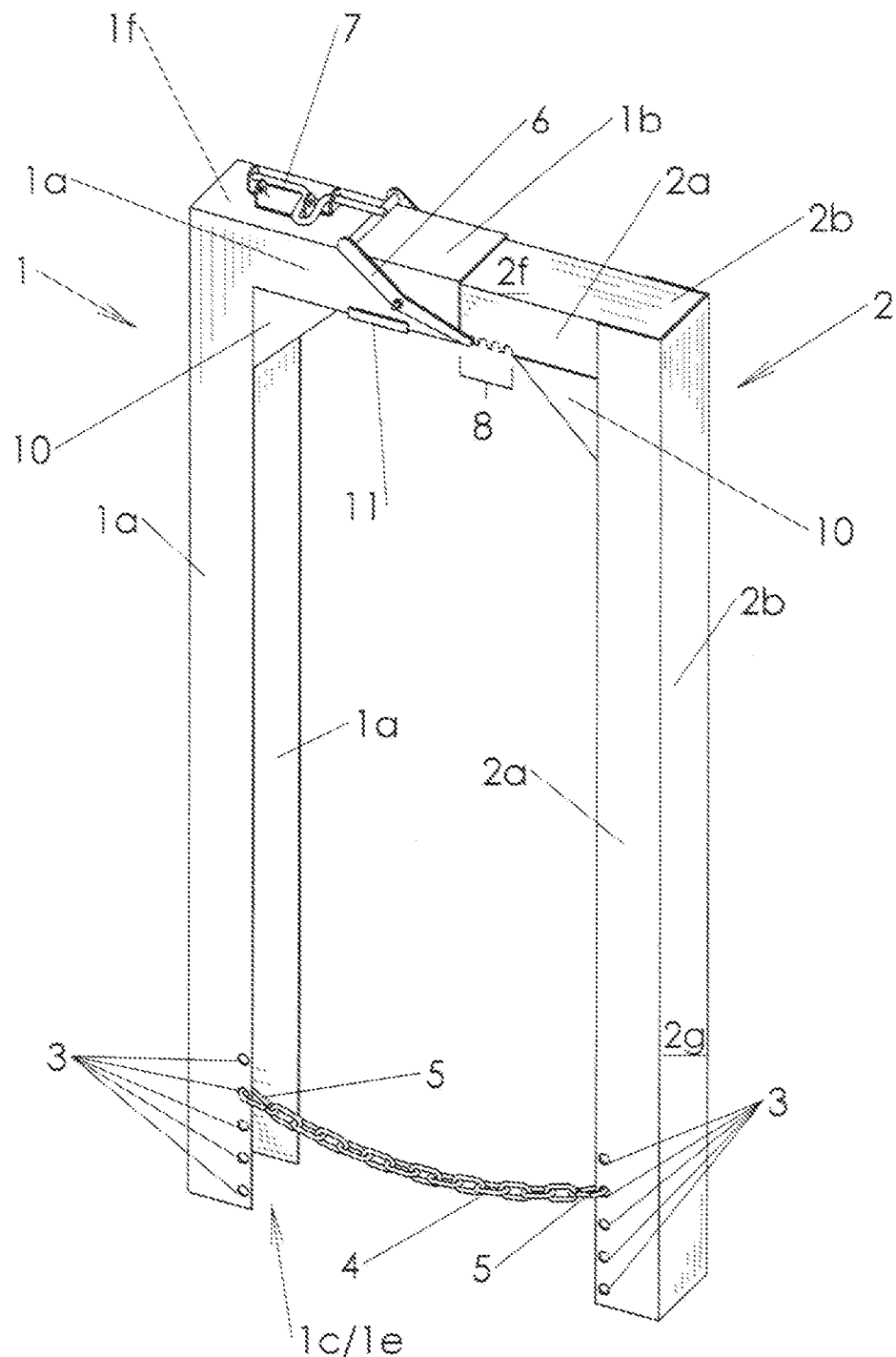
FIG. 9 is a top perspective view of a second embodiment of the present invention.
Figure 10:
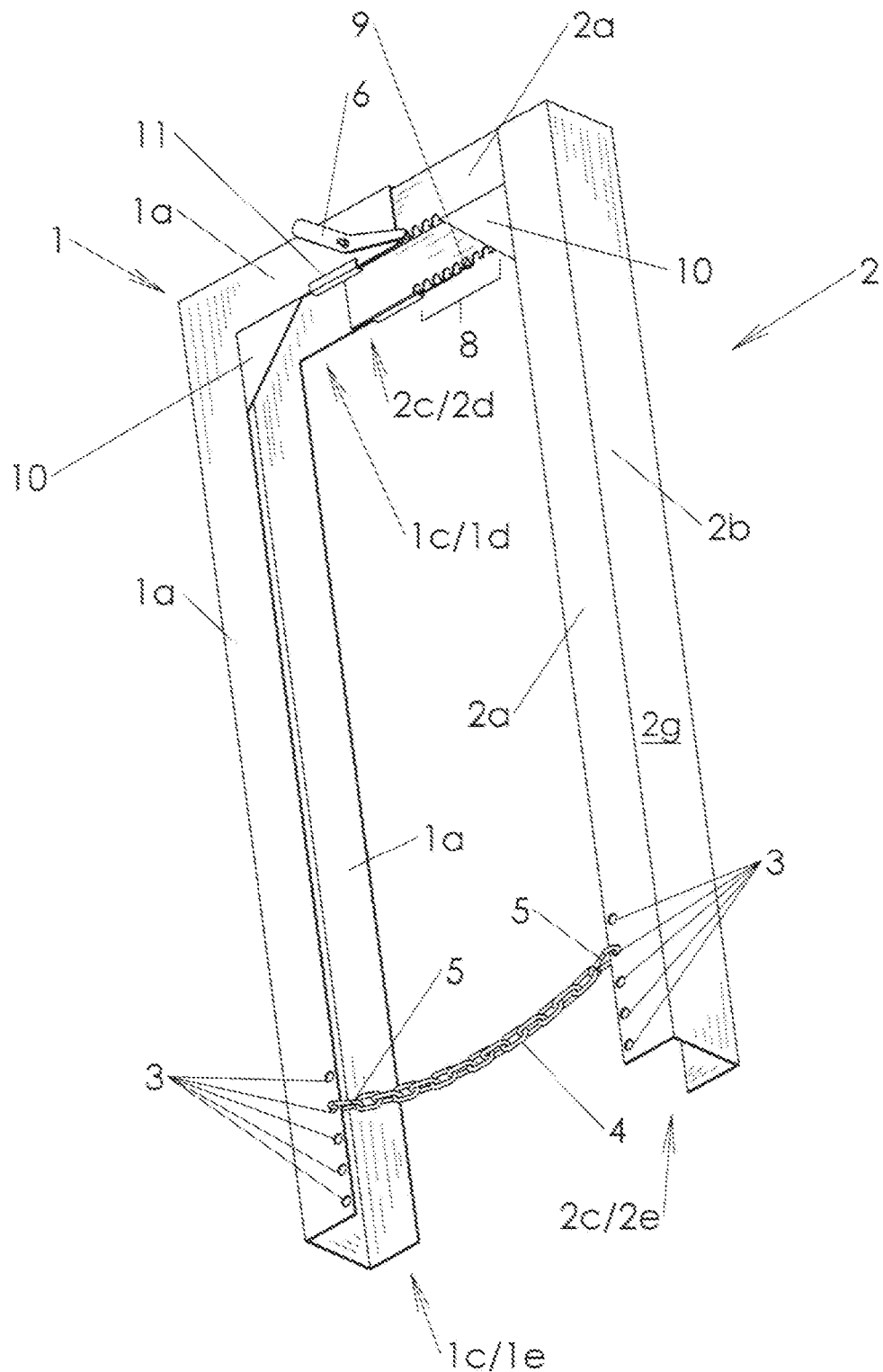
FIG. 10 is a bottom perspective view of a second embodiment of the present invention.
Figure 11:
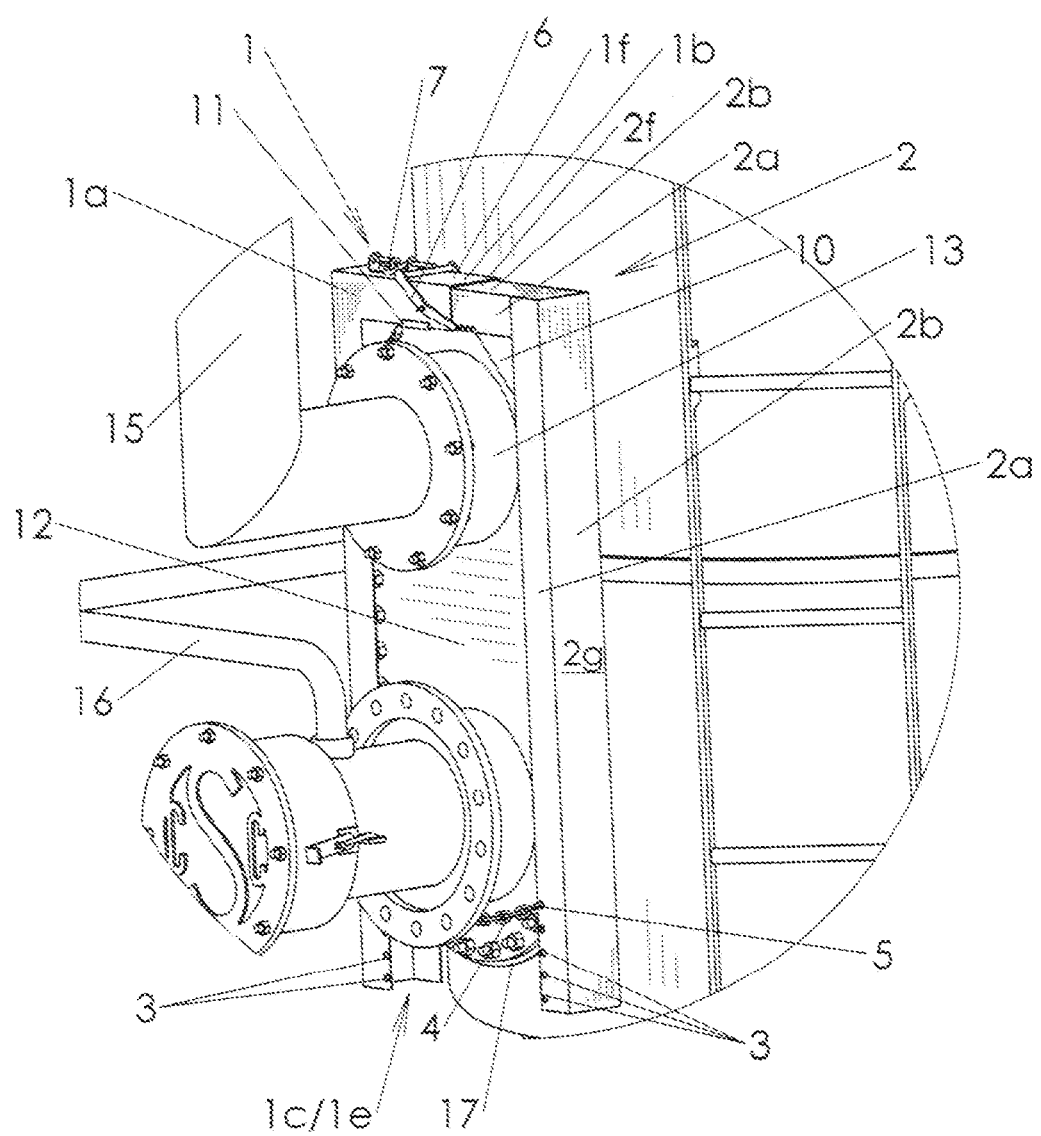
FIG. 11 is a first perspective view of a second embodiment of the present invention installed on a vertical heater treater.
Figure 12:
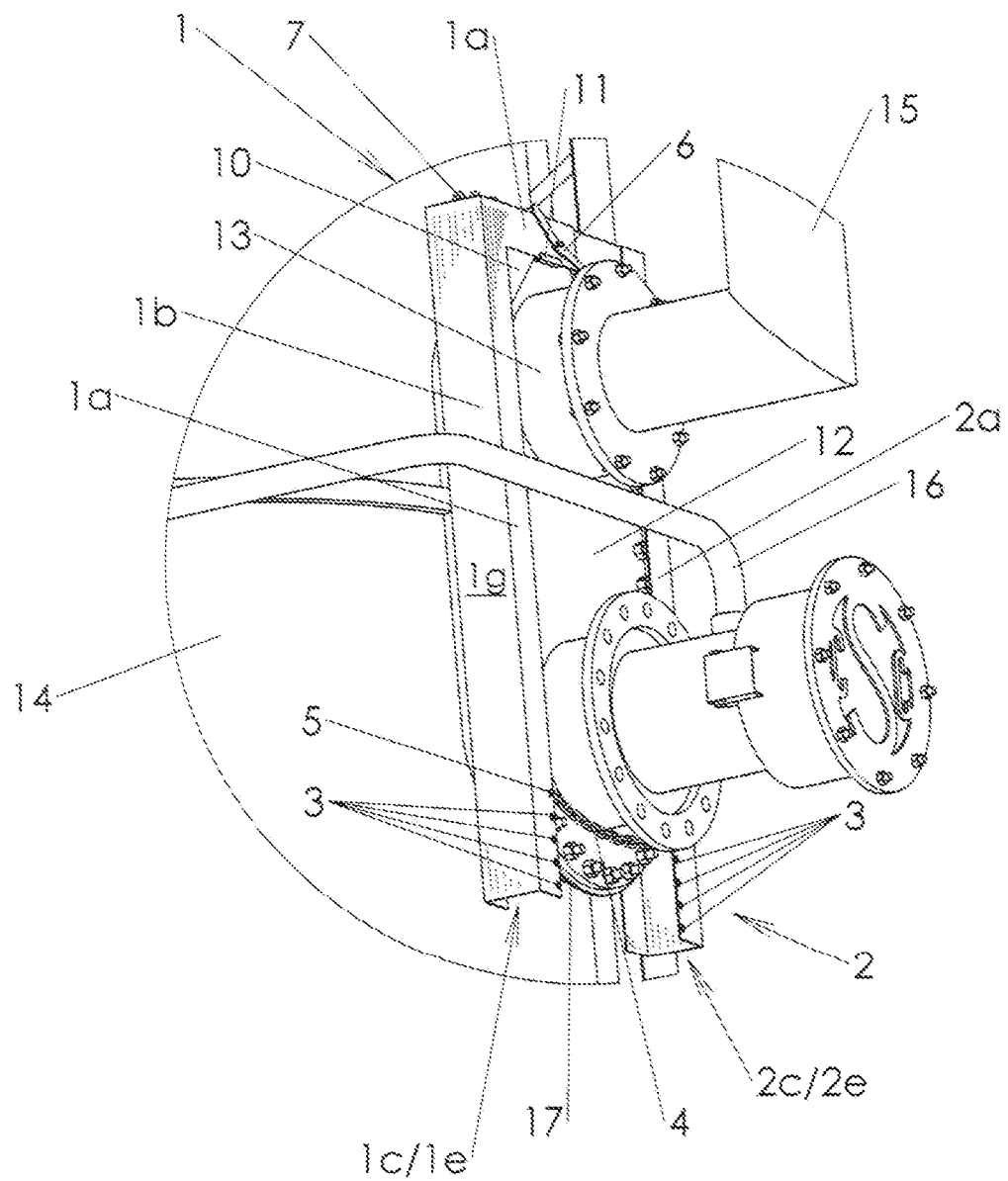
FIG. 12 is a second perspective view of a second embodiment of the present invention installed on a vertical heater treater.

FIGS. 9 and 10 are top and perspective views, respectively, of a second embodiment of the present invention. This embodiment is identical to the first embodiment except that the top portion 1f, 2f of the flat center surface is shorter than that of the first embodiment, and the bottom portion 1g, 2g of the flat center surface is longer than that of the first embodiment. In other words, the top section 1d, 2d of the channel is shorter than that of the first embodiment, and the bottom section 1e, 2e of the channel is longer than that of the first embodiment. This particular configuration allows the apparatus to fit around the fire tube flange 12 on the vertical heater treater 14, as shown in FIGS. 11 and 12.

Figure 13:
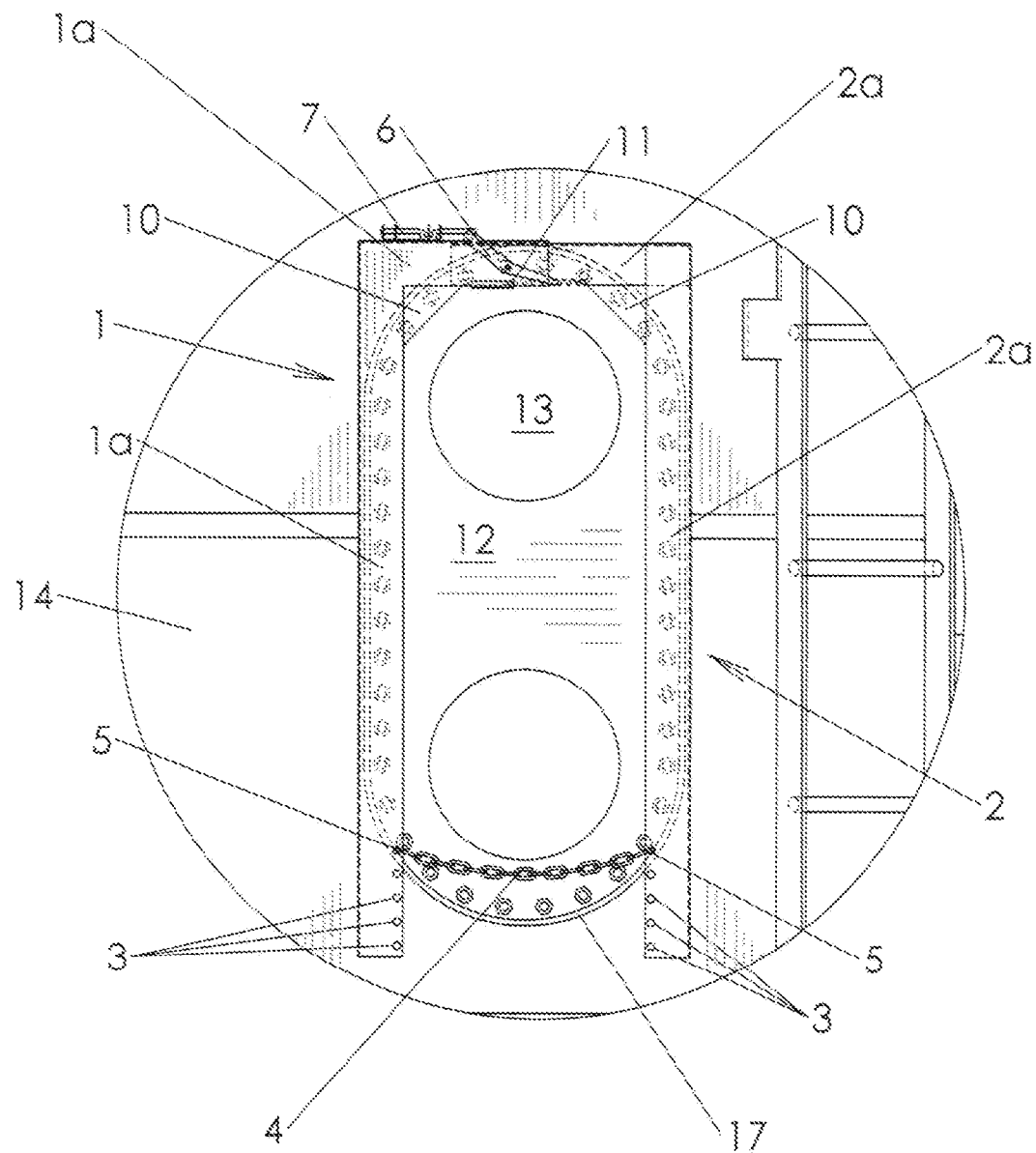
FIG. 13 is a front view of a second embodiment of the present invention installed on a vertical heater treater.

FIG. 13 is a front view of a second embodiment of the present invention installed on a vertical heater treater. Just as with the first embodiment, the first and second L-shaped members 1, 2 deflect any oil or hot water that leaks out of the rubber gasket 17 down and into the containment dike (not shown).

Figure 14:
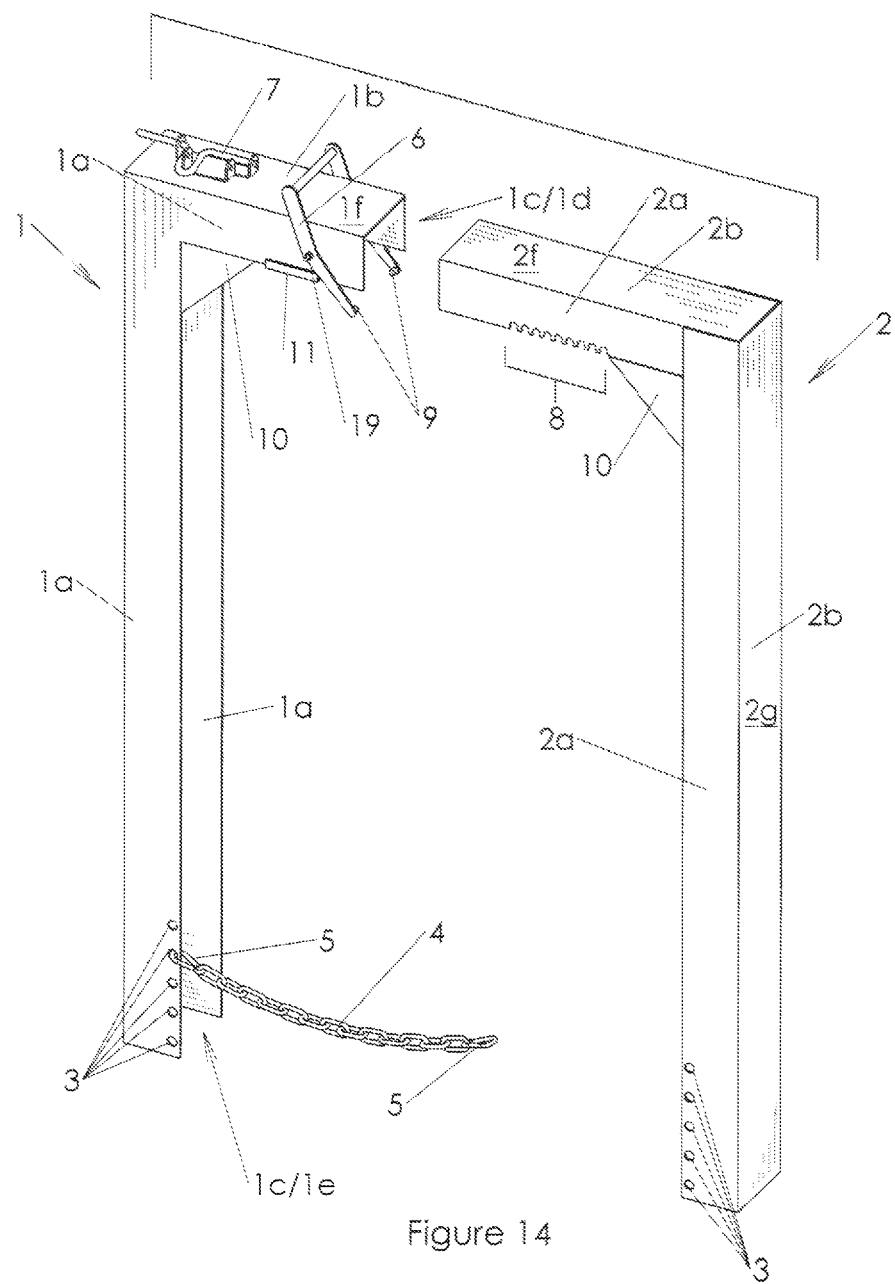
FIG. 14 is an exploded view of a second embodiment of the present invention.
Figure 15:
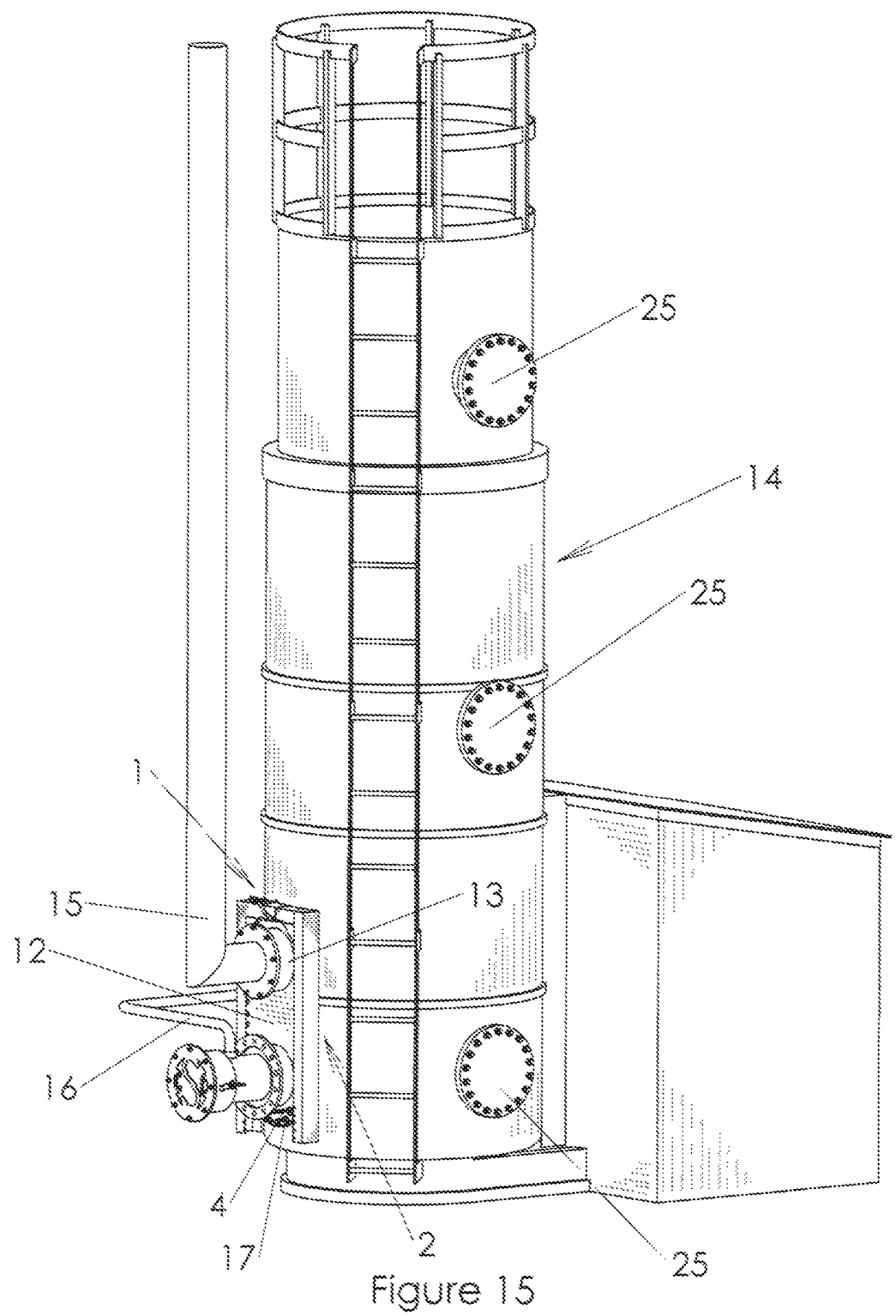
FIG. 15 is a perspective view of a vertical heater treater showing the manway covers.
Figure 16:
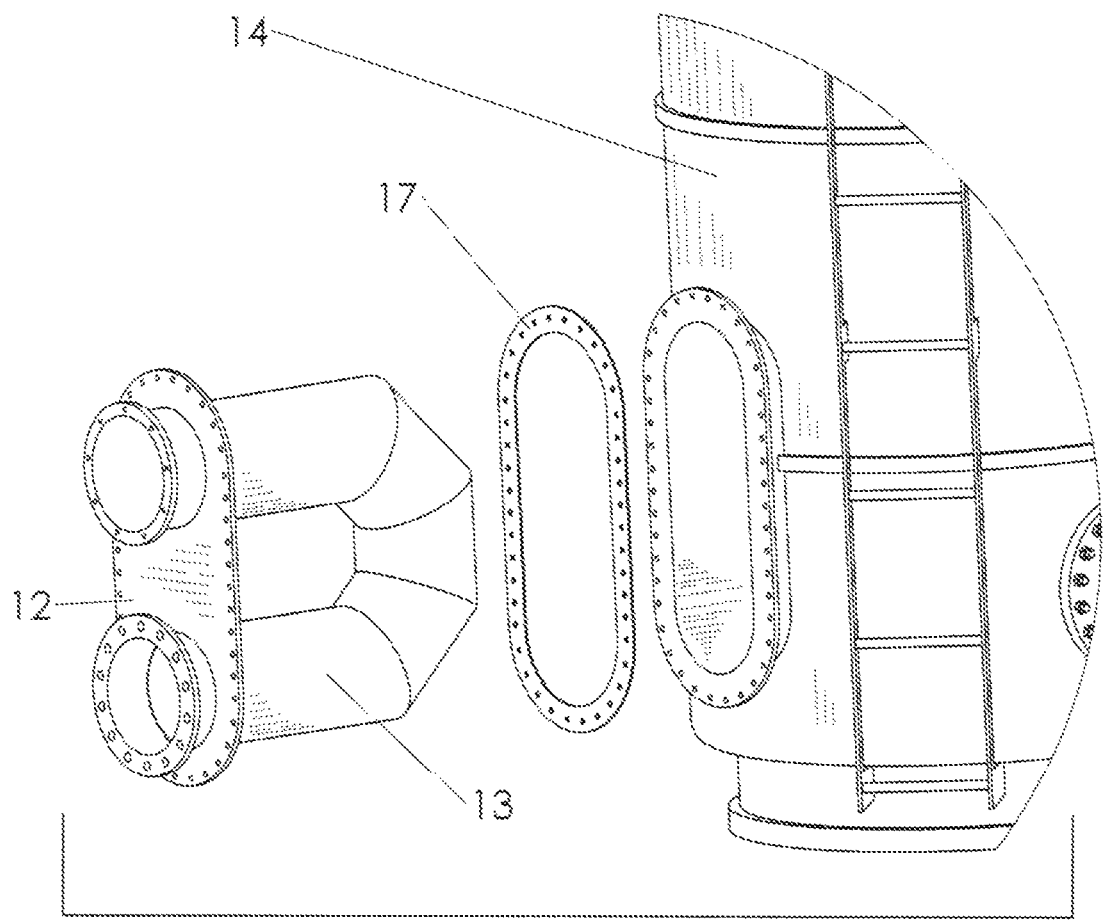
FIG. 16 is a partial exploded view of a vertical heater treater showing the fire tube and the rubber gasket.
Figure 17:
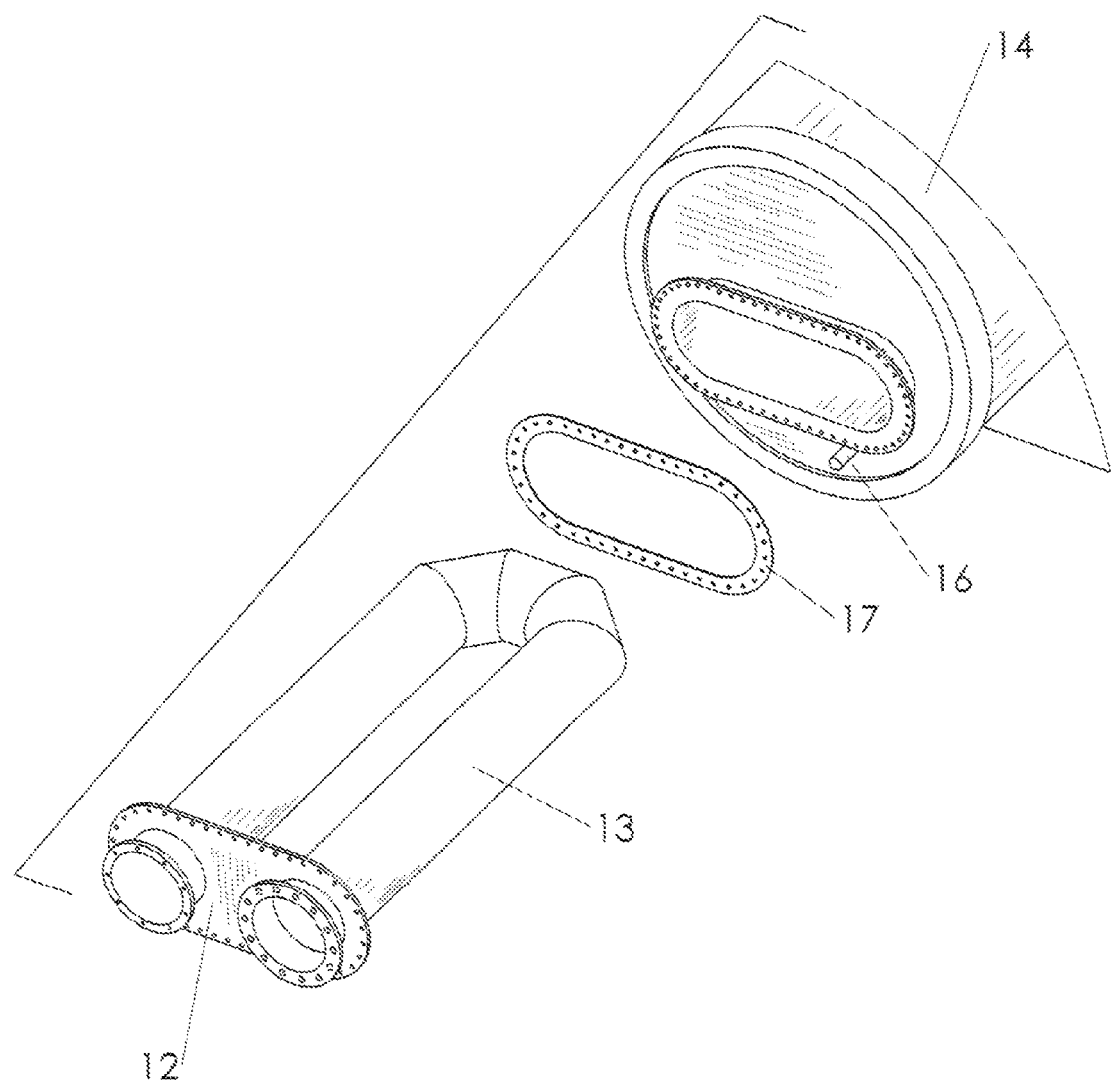
FIG. 17 is a partial exploded view of a horizontal heater treater showing the fire tube and the rubber gasket.

FIG. 14 is an exploded view of a second embodiment of the present invention. This figure is identical to FIG. 6 except that the sides of the L-shaped members are longer and the tops of the L-shaped members are shorter than in the first embodiment. Otherwise, the first and second embodiments are structurally the same, and they operate similarly in all respects.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:
1. An apparatus for defecting leaking oil comprising:
   (a) a first L-shaped member comprising a pivot arm and a latch mechanism; and
   (b) a second L-shaped member that is slidably coupled to the first L-shaped member;
   wherein the pivot arm on the first L-shaped member is configured to pivot on the first L-shaped member and to engage with a plurality of recesses on the second L-shaped member;
   wherein the latch mechanism is configured to lock and unlock the pivot arm;
   wherein each of the first and second L-shaped members comprises a flat center surface and two flat side surfaces that form a channel on an underside of each of the first and second L-shaped members; and
   wherein the channels of the first and second L-shaped members are configured to fit around at least one flange on a heater treater.

2. The apparatus of claim 1, wherein the first L-shaped member comprises a plurality of apertures at a bottom end of the first L-shaped member;
   wherein the second L-shaped member comprises a plurality of apertures at a bottom end of the second L-shaped member; and
   wherein the apertures on the bottom end of the first L-shaped member and the apertures on the bottom end of the second L-shaped member are configured for attachment of a chain.

3. The apparatus of claim 1, wherein the channel of the first L-shaped member comprises a top section and a side section, and wherein the top section is longer than the side section; and
   wherein the channel of the second L-shaped member comprises a top section and a side section, and wherein the top section is longer than the side section.

4. The apparatus of claim 1, wherein the channel of the first L-shaped member comprises a top section and a side section, and wherein the side section is longer than the top section; and wherein the channel of the second L-shaped member comprises a top section and a side section, and wherein the side section is longer than the top section.

\* \* \* \* \*